(12) United States Patent
Rabbat et al.

(10) Patent No.: US 8,543,715 B1
(45) Date of Patent: Sep. 24, 2013

(54) REDIRECT CONTROL IN WEB BROWSERS

(75) Inventors: Richard Rabbat, Palo Alto, CA (US);
Eyal Manor, Plainview, NY (US)

(73) Assignee: Google Inc., Mountain View, CA (US)

( * ) Notice: Subject to any disclaimer, the term of this patent is extended or adjusted under 35 U.S.C. 154(b) by 186 days.

(21) Appl. No.: 13/004,958

(22) Filed: Jan. 12, 2011

Related U.S. Application Data

(60) Provisional application No. 61/406,538, filed on Oct. 25, 2010.

(51) Int. Cl.
*G06F 15/16* (2006.01)
(52) U.S. Cl.
USPC ............ 709/229; 709/219; 709/224; 709/245
(58) Field of Classification Search
USPC .................. 709/219, 224, 229, 245
See application file for complete search history.

(56) References Cited

U.S. PATENT DOCUMENTS

| | | | |
|---|---|---|---|
| 6,286,045 B1* | 9/2001 | Griffiths et al. | 709/224 |
| 7,177,901 B1* | 2/2007 | Dutta | 709/203 |
| 7,441,026 B2* | 10/2008 | Prabhakar et al. | 709/224 |
| 7,734,624 B2 | 6/2010 | Anderson et al. | 707/727 |
| 7,899,801 B1* | 3/2011 | Bronson et al. | 707/706 |
| 7,937,405 B2* | 5/2011 | Anderson et al. | 707/770 |
| 2002/0123334 A1* | 9/2002 | Borger et al. | 455/419 |
| 2002/0143520 A1* | 10/2002 | Gauthier et al. | 704/1 |
| 2002/0169670 A1* | 11/2002 | Barsade et al. | 705/14 |
| 2004/0267610 A1* | 12/2004 | Gossett et al. | 705/14 |
| 2005/0216342 A1* | 9/2005 | Ashbaugh | 705/14 |
| 2009/0100505 A1* | 4/2009 | Shaty | 726/3 |
| 2009/0313116 A1* | 12/2009 | Ashbaugh | 705/14.47 |
| 2011/0252117 A1* | 10/2011 | Sng et al. | 709/219 |
| 2011/0276720 A1* | 11/2011 | Ickman et al. | 709/245 |

OTHER PUBLICATIONS

McDaniel, Adam (2012). HTML5: Your visual blueprint for designing rich web pages and applications. Hoboken, NJ: John Wiley & Sons, Inc.*
Josh (Dec. 21, 2005). "What Is the Redirection Limit?". Web 1 Marketing. Retrieved from http://www.web1marketing.com/blog/index.php/archives/what-is-the-redirection-limit/.*
Hickson, Ian (ed.) (Jun. 24, 2010). "Abstract", "Status of This document" and "Table of Contents". HTML 5: A vocabulary and associated APIs for HTML and XHTML: W3C Working Draft Jun. 24, 2010. Retrieved from http://www.w3.org/TR/2010/WD-html5-20100624/.*
Hickson, Ian (ed.) (Jun. 24, 2010). "4.8.2 The iframe element". HTML 5: A vocabulary and associated APIs for HTML and XHTML: W3C Working Draft Jun. 24, 2010. Retrieved from http://www.w3.org/TR/2010/WD-html5-20100624/the-iframe-element.html.*

(Continued)

*Primary Examiner* — Aaron Strange
*Assistant Examiner* — Timothy Sowa
(74) *Attorney, Agent, or Firm* — Sterne, Kessler, Goldstein & Fox P.L.L.C.

(57) ABSTRACT

The capability to limit the number of user redirects for a third-party content provider or third-party content provider network, such as, for example, an advertiser or advertising network, is provided. Such a capability extends the functionality of an attribute of a HyperText Markup Language (HTML) element to establish a limit to the number of user redirects. Accordingly, such a limit can be used to enforce restrictions on the number of user redirects through a user's web browser.

20 Claims, 8 Drawing Sheets

(56) References Cited

OTHER PUBLICATIONS

Fisher, Darin (May 9, 2007). network.http.redirection.limit. mozillaZine Knowledge Base. Retrieved from http://kb.mozillazine.org/Network.http.redirection-limit.*

Barth et al., "The Security Architecture of the Chromium Browser," Google Inc., 2008, 10 pages.
Langheinrich et al., "Unintrusive Customization Techniques for Web Advertising," NEC Corporation, C&C Media Research Laboratories, 1999, 17 pages.

* cited by examiner

REDIRECT CONTROL IN WEB BROWSERS

CROSS REFERENCE TO RELATED APPLICATIONS

The present application claims the benefit of U.S. Provisional Patent Application No. 61/406,538, filed on Oct. 25, 2010, entitled "Redirect Control in Web Browsers" by Rabbat et al., which is incorporated herein by reference in its entirety.

BACKGROUND

1. Field

Embodiments relate generally to the field of web browsers.

2. Background

The emergence and development of the Internet allows users to access a wide range of resources. For example, different web site publishers maintain web pages for particular subjects that are accessible over the Internet. Access to these resources presents opportunities for third-party content providers (e.g., advertisers) to offer third-party content (e.g., advertisements) to be provided along with the resources. A web page can, for example, include advertisement slots in which advertisements can be presented. These advertisement slots can be defined for presentation within a web page, for example, in an inline frame (or simply "an iframe") or other content area within the web page. The advertisement slots can also be defined in the web page.

Web content delivery systems provide technology to web site publishers and third-party content providers to serve content on a particular publisher's web site. However, the delivery of the publisher's web site to the user via the user's web browser may be impacted by such a content delivery system. For example, an advertising exchange allows the purchase and sale of advertisement slots associated with web pages between different advertising networks. An advertising network that purchases an advertisement slot may place an advertisement of its own on the web page in question or alternatively, redirect to another advertising network, for example, by selling the advertisement slot. This kind of redirection may occur in a daisy-chain fashion and involve numerous advertising networks. In some cases, the daisy chain may redirect back to advertising networks that came earlier in the chain of redirects.

Such a chain of redirection can lead to increased latency and reduced performance while the browser tries to render the web page. In addition, when a publisher's web page redirects to a number of advertising networks in a daisy chain, each advertising network typically leaves a cookie in the user's browser, which may pose privacy concerns for the user. Further, such long redirect chains have been generally observed to increase the risk of receiving spam advertisements.

It is possible for web site publishers and web content (e.g., advertising) delivery systems to form agreements that establish limits to the number of redirects a third-party content provider or third-party content provider network (e.g., an advertising network) is allowed to perform. However, conventional solutions do not provide an effective way of actually enforcing such limits.

BRIEF SUMMARY

The capability to limit the number of user redirects for a third-party content provider or third-party content provider network, such as, for example, an advertiser or advertising network, is provided. Such a capability extends the functionality of an attribute of a HyperText Markup Language (HTML) element to establish a limit to the number of user redirects. Accordingly, such a limit can be used to enforce restrictions on the number of user redirects through a user's web browser. Benefits associated with such redirection limits include, but are not limited to, lower latency for users, reduced risk of spam, better privacy control by limiting the number of cookies that can get stored on a user's system after each redirect, and better accountability and transparency from third-party content providers.

In an embodiment, elements (e.g., HTML elements) encoded in a web page are parsed. The web page is retrieved by the user's web browser in response to a request by the user to navigate to the web page. A redirect limit associated with an attribute of a frame element within the web page is identified. The redirect limit specifies a maximum number of user redirects the user's web browser may perform for a third-party resource corresponding to the frame element. A user redirect request associated with the third-party resource is handled based on the determined redirect limit. The user redirect request is performed as long as the redirect limit has not been exceeded. The redirect limit is exceeded when the maximum number of redirects has been reached. If it is determined that the redirect limit has been reached, the user redirect request is not handled and the redirect chain is no longer followed.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

Figure 1:
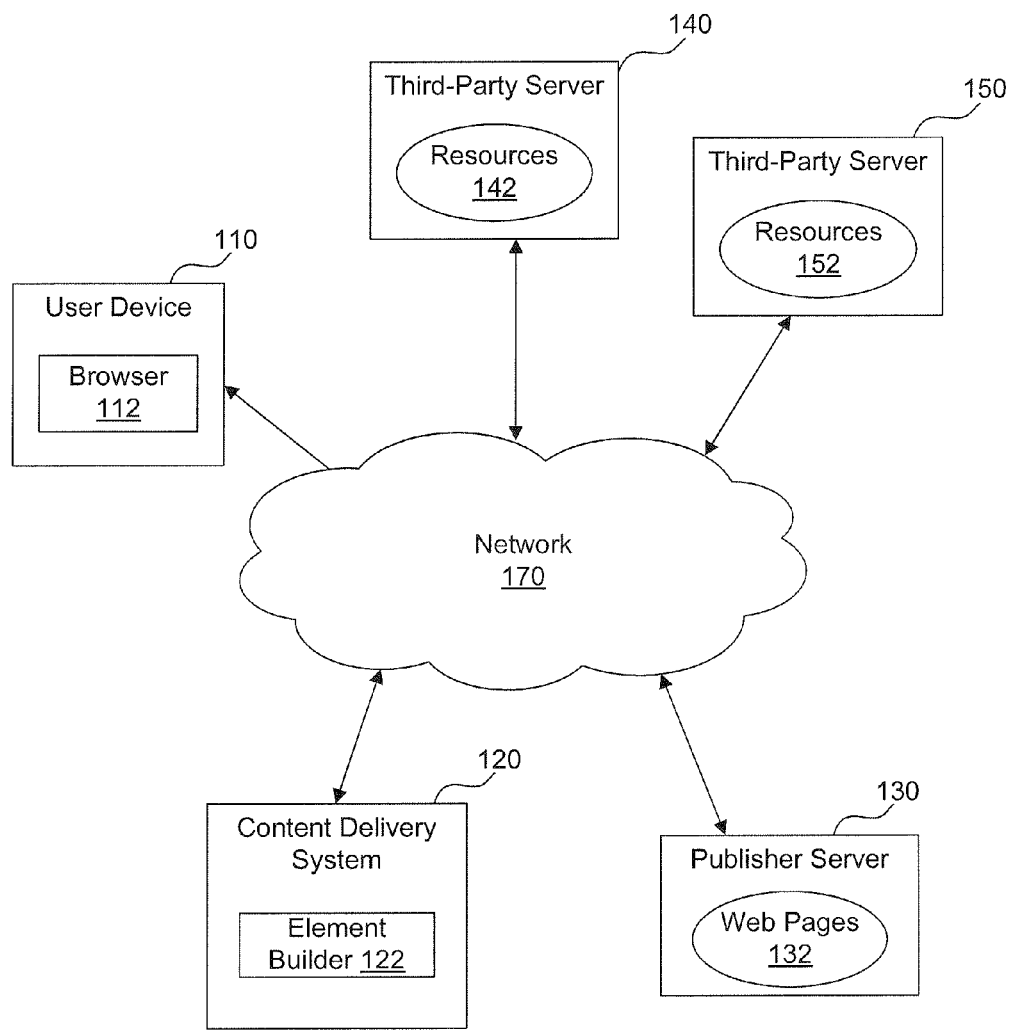
FIG. 1 is a diagram of an exemplary distributed system suitable for practicing an embodiment.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Embodiments relate to limiting user redirects associated with third-party content providers on a publisher's web page displayed in a web browser. As will be described in further detail below, embodiments can extend the functionality of an attribute of a HyperText Markup Language (HTML) element to establish a limit to the number of user redirects. Accordingly, such a limit can be used to enforce restrictions on the number of user redirects through a user's web browser. Benefits associated with such redirection limits include, but are not limited to, lower latency for users, reduced risk of spam, better privacy control by limiting the number of cookies that can get stored on a user's system after each redirect, and better accountability and transparency from third-party content providers.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "publisher" is used herein to refer broadly and inclusively to any web page content owner who enables one or more third-party content providers to serve content that is displayed in the content owner's web page. An example of a third-party content provider includes, but is not limited to, an advertiser or advertiser networks. Examples of an advertiser network include, but are not limited to, ADSENSE, AD EXCHANGE, and DOUBLE-CLICK FOR PUBLISHERS (DFP) from GOOGLE Inc. of Mountain View, Calif. It is noted that embodiments are described with respect to advertisers and advertisements for illustrative purposes only and embodiments are not intended to be limited thereto. A person skilled in the relevant art would appreciate that embodiments may be used with other third-party content providers and other types of third-party content. It would be apparent to a person skilled in the relevant art given this description that publishers and third-party content providers may use any number of well-known applications, services, protocols, or frameworks to communicate with each other over a network, such as the Internet.

The terms "frame" and "frame element" are used interchangeably herein to refer broadly and inclusively to an HTML frame element that can be used to segment the display area of a web browser window. Different frames may be used to display content corresponding to different browsing contexts within the browser window. Such a frame element includes an inline frame (or "iframe") element that may be used to display content that is separate and independent from other content displayed in a web page. Iframe elements will be discussed in further detail below.

The terms "resource" and "web resource" are used herein to refer broadly and inclusively to any data that can be provided over a network. A resource may be identified by a resource location address, for example, in a Uniform Resource Locator (URL) and/or Uniform Resource Identifier (URI), that is associated with the resource. Examples of resources include, but are not limited to, HTML pages, word processing documents, and portable document format (PDF) documents, images, video, and feed sources. The resources can include content, such as words, phrases, images and sounds, that may include embedded information (such as meta-information in hyperlinks) and/or embedded instructions (such as JAVASCRIPT scripts).

The terms "browser" and "web browser" are used interchangeably herein to refer broadly and inclusively to any web browsing application, protocol, framework, or service as would be apparent to a person skilled in the art given this description. An example web browser that may be adapted to incorporate embodiments as described herein includes, but is not limited to, the GOOGLE CHROME browser from GOOGLE Inc. of Mountain View, Calif.

I. Introduction

Embodiments relate to limiting the number of user redirects associated with third-party content displayed on a publisher's web page. Such third-party content can include, for example and without limitation, advertisements. Examples of other types of third-party content include, but is not limited to, web "widgets" or "gadgets" such as, for example, a control button rendered on a web page linking functionality associated with a social networking site (e.g., the "LIKE" button from FACEBOOK, Inc. of Palo Alto, Calif. or the "GOOGLE BUZZ" button from GOOGLE Inc. of Mountain View, Calif.). Further, such content can be displayed in a frame within the web page rendered by a user's web browser. Frames enable web browsers to display content in a particular content area or segment of the browser. window.

An example of such a frame includes, but is not limited to, an inline frame (or simply "iframe"). As will be described in further detail below, an iframe is a type of frame that enables a browser to display third-party content, such as an HTML document, that is embedded within the publisher's web page but served by a third-party content provider not in the publisher's control. Iframes may be incorporated with the general design of a publisher's web page and appear within a user's web browser as a textual or graphical object on the publisher's web page.

An example of a third-party content provider includes, but is not limited to, an advertiser or advertiser network. Thus, an iframe may be used by an advertiser or advertiser network to display advertisements within the publisher's web page. As will be described in further detail below, embedded HTML code associated with frames in a publisher's web page in addition to the redirection functionality enabled by the Hypertext Transfer Protocol (HTTP) allows the publisher's content in the web page to remain separate from the third-party content. As the publisher generally hosts such third-party content on the publisher's web page, the publisher may expect the third-party content provider to serve secure content. However, a high number of user redirections generally leads to performance, security, and reliability issues. Moreover, a high number of user redirects exposes users to viruses and other various threats that may hijack the user's computer and/or browser. Although it is possible for publishers and third-party content providers to form agreements that establish limits to the number of user redirects, conventional solutions do not provide an effective way of actually enforcing such limits. Thus, by controlling such redirects, an underlying benefit provided by embodiments, as will be described further below, is helping to make Internet transactions more secure while allowing reputable content providers to better protect their users.

II. System

FIG. 1 is a diagram of an exemplary distributed system 100 suitable for practicing an embodiment. In the example shown in FIG. 1, system 100 includes a user device 110, a content delivery system 120, a publisher server 130, a third-party server 140, a third-party server 150, and a network 170. User device 110 includes a browser 112. Content delivery system 120 includes an element builder 122.

In an embodiment, user device 110 communicates with publisher server 130, third-party server 140, and third-party server 150 over network 170. User device 110 can be any type of computing device with at least one processor, local memory, display, and one or more input devices (e.g., a mouse, QWERTY keyboard, touch-screen, microphone, or a T9 keyboard). Such a computing device can include, but is not limited to, a mobile phone, a personal digital assistant (PDA), a computer, a cluster of computers, a set-top box, or other similar type of device capable of processing instructions. Similarly, publisher server 130, third-party server 140, and third-party server 150 can each be implemented using any type of computing device capable of serving data to user device 110. Although only publisher server 130, third-party server 140, and third-party server 150 are shown, additional servers may be used as applicable.

Network 170 can be any network or combination of networks that can carry data communication. Such network can include, but is not limited to, a wired (e.g., Ethernet) or a wireless (e.g., Wi-Fi and 3G) network. In addition, network 170 can include, but is not limited to, a local area network, medium area network, and/or wide area network such as the Internet. Network 170 can support protocols and technology including, but not limited to, Internet or World Wide Web protocols and/or services. Intermediate network routers, gateways, or servers may be provided between components of system 100 depending upon a particular application or environment.

User device 110 executes browser 112. Browser 112 can be any type of web browser or similar application. Browser 112 requests web pages 132 associated with publisher server 130. Web pages 132 may be generated by a publisher (not shown) using one or more browser-supported languages including, but not limited to, JavaScript, VBScript, Hyper Text Markup Language (HTML), or any other type of language for writing web pages. Although only publisher server 130 is shown in FIG. 1, web pages 132 may be served over network 170 using one or more servers as may be necessary. The location of each web page in web pages 132 may be identified by a location address, such as a Uniform Resource Locator (URL). The URL can be entered into a web address field of browser 112 by a user (not shown) at user device 110 in order to navigate to the particular web page corresponding to the URL.

In an embodiment, browser 112 requests a web page from publisher server 130 over network 170 using one or more well known communication protocols such as, for example, Hypertext Transfer Protocol (HTTP). The web page is displayed by browser 112 in a content display area of browser 112. The web page is viewed by a user via a display or rendering device (not shown) coupled to user device 110. Such a display or rendering device can include, but is not limited to, a cathode ray tube (CRT) monitor or liquid crystal display (LCD) screen. As would be apparent to a person skilled in the relevant art given this description, the user can also interact with browser 112 to perform various tasks such as, for example, directing browser 112 to different web pages. Browser 112 receives user input from one or more input devices (not shown), such as, for example, a mouse, keyboard, or touch screen, coupled to user device 110.

In an embodiment, publisher server 130 returns the relevant web page in response to the request from browser 112. In an embodiment, browser 112 decodes the HTML in which the web page is encoded. The HTML code of the web page may specify a location or source of third-party content, which may be a web resource (e.g., a separate web page or graphical object) that is to be embedded within the publisher's web page as it is rendered in a window of browser 112. For example, the location or source of the third-party content may correspond to third-party server 140. Browser 112 can transmit a request (e.g., using HTTP) for the web resource to third-party server 140 over network 170. In response to the request from browser 112, third-party server 140 can retrieve the requested web resource from resources 142 and transmit the resource to browser 112 over network 170. Resources 142 may be stored at third-party server 140 or another storage location accessible to third-party server 140. It would be apparent to a person skilled in the relevant art given this description that third-party server 140 can use any one of a number of well-known methods to retrieve and transmit the web resource based on the request from browser 112. Once the resource in question is received, it may be displayed or rendered with the publisher's web page in a window of browser 112.

Figure 3:
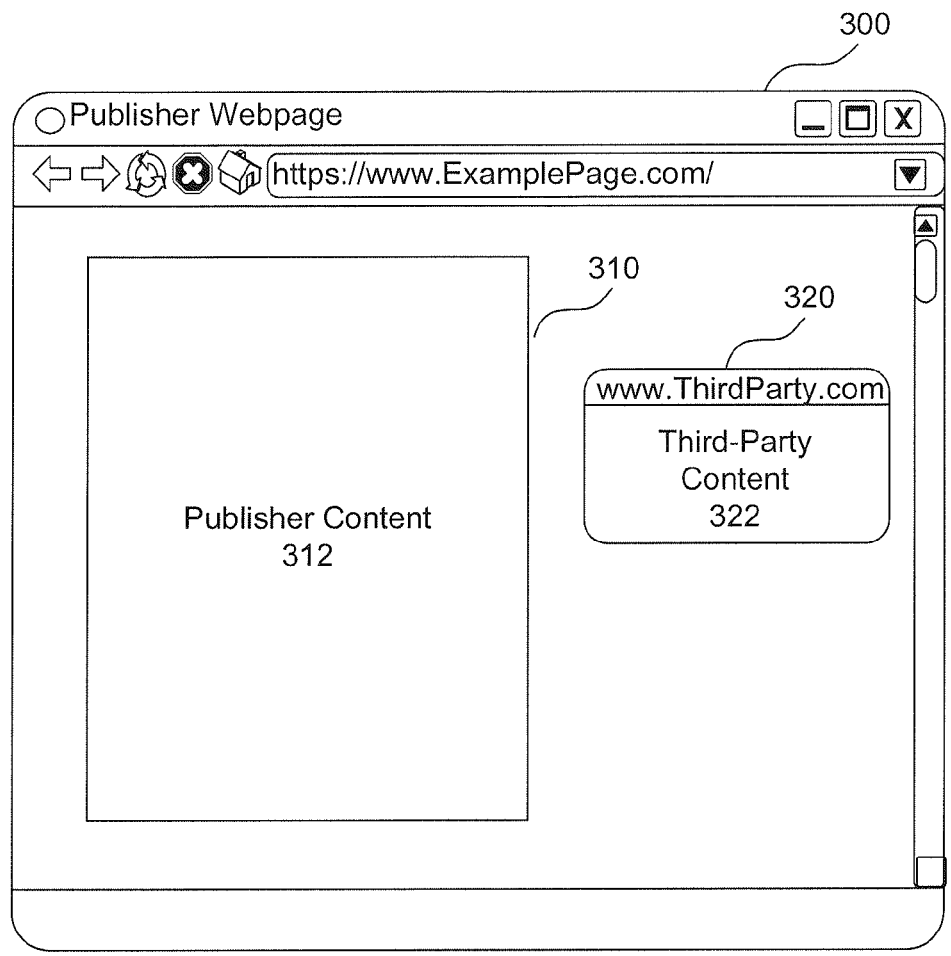
FIG. 3 illustrates an exemplary window of a web browser displaying an inline frame with third-party content within a publisher's web page, according to an embodiment.

In an embodiment, browser 112 displays the third-party content using an inline frame within the web page (see, e.g., iframe 320 in example browser window 300 of FIG. 3, discussed below). For example, the HTML within the publisher's web page may include an iframe element, which instructs browser 112 to display such an iframe object when rendering the web page within a window of browser 112. The iframe element is generally specified for a web page using the following HTML tags: <iframe> . . . </iframe>. The iframe element represents a browsing context (i.e., an area within a browser window in which objects may be presented to a user) nested within the browsing context of the publisher's web page.

As discussed previously, the iframe object within the browser's window can be used to display embedded HTML content that is separate and independent from other content associated with the publisher's web page. As would be apparent to a person skilled in the relevant art given this description, an HTML iframe element is generally associated with a Document Object Model (DOM) interface having a number of attributes. An example of an attribute of an iframe element includes, but is not limited to, a source attribute that provides the location address of a web page that the nested browsing context of the iframe is to contain within the browser window. Another attribute associated with an iframe element is the sandbox attribute that, when specified, enables a set of additional restrictions on any content hosted by the iframe object within a user's browser. A person skilled in the relevant art would appreciate additional features of HTML elements, including iframe elements, and element attributes.

In an example, third-party server 140 may be an advertising server (or simply "ad server") associated with an advertiser or advertiser network and the third-party content displayed in the iframe may be an advertisement. In this regard, iframes allow the publisher's web page content to be separated from an advertisement. After obtaining the page content from the publisher server 130, browser 112 can request a dynamically selected advertisement from third-party-server 140 (e.g., configured as an ad server). A user at browser 112 can use an input device (e.g., a mouse) to select (or click) the advertisement within the browser window and be redirected to a different web site associated with the advertisement.

In an embodiment, third-party server 140 may transmit a redirection, or redirect, request to browser 112 instead of serving the requested resource (e.g., an advertisement). For example, the redirect request may redirect browser 112 to a location address corresponding to third-party server 150. In response to such a redirect request, browser 112 may transmit another request for the resource to third-party server 150 over network 170, which may be similar to the initial request sent to third-party server 140. Third-party server 150 may return the resource as requested or send another redirect request to a different location back to browser 112. In this manner, the browser 112 may be redirected numerous times among various third-party servers in a chain of redirections before actually receiving the resource to be displayed, for example, in an iframe object within the web page. It is noted that although only third-party servers 140 and 150 are illustrated, additional third-party servers may be used as necessary.

In an embodiment, content delivery system 120 communicates with publisher server 130 over network 170. In an example, content delivery system 120 may be an advertising delivery system such as, for example and without limitation, ADSENSE, AD EXCHANGE, and DOUBLE-CLICK FOR PUBLISHERS (DFP) from GOOGLE Inc. of Mountain View, Calif. It is noted that embodiments are described with respect to advertisers and advertisements for illustrative purposes only and embodiment are not intended to be limited thereto. A person skilled in the relevant art would appreciate that embodiments may be used with other third-party content providers and other types of third-party content.

In an embodiment, content delivery system 120 uses element builder 122 to build a snippet of HTML code corresponding to an element of a web page for publisher server 130. In an embodiment, the element may be an iframe element, as described above. The HTML code snippet may be transmitted by content delivery system 120 to publisher server 130 over network 170. In an embodiment, the code snippet from content delivery system 120 is inserted by publisher server 130 into one or more web pages within web pages 132. The format of the snippet may be similar to the following example: <iframe sandbox="allow-user-redirect=3" src='URL B'></iframe>. "URL B" in this example can represent a URL of a third-party resource that is to be displayed in an iframe within a publisher web page. In an embodiment, content delivery system 120 uses the code snippet to specify a redirect limit, which restricts the number of redirects that are allowed when browser 112 tries to display the publisher web page and the resource associated with the iframe within the publisher web page, as described above. The redirect limit has a value, which may be, for example, a positive integer value corresponding to the maximum number of allowable user redirects.

Figure 2:
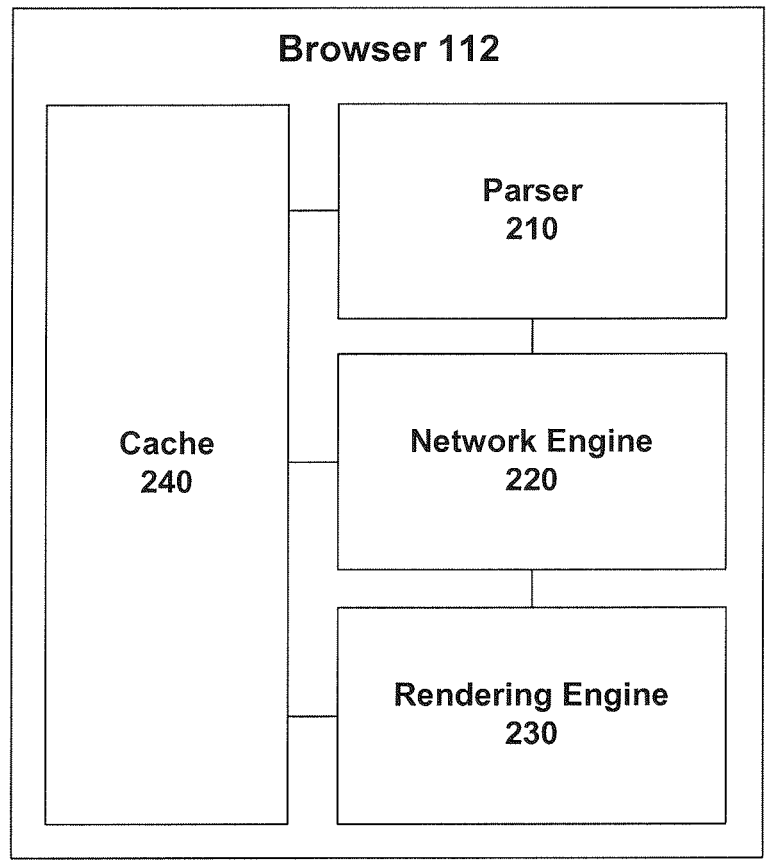
FIG. 2 is a diagram of an exemplary web browser for limiting user redirects, according to an embodiment.

FIG. 2 is a diagram of an exemplary web browser 112 for limiting user redirects, according to an embodiment. Browser 112 includes a parser 210, a network engine 220, a rendering engine 230, and a cache 240. For ease of explanation, browser 112 and its components, including parser 210, network engine 220, rendering engine 230, and cache 240, may be described with respect to system 100 of FIG. 1, but embodiments are not limited thereto.

In an embodiment, parser 210 parses HTML code associated with a publisher's web page (e.g., from publisher server 130 of FIG. 1, as described above). Parser 210 may parse each element in the HTML code, for example, by parsing or interpreting each tag within the code. In an embodiment, parser 210 parses an iframe element having a sandbox attribute set to a redirect limit, as described above. For example, the code for the iframe element may be an HTML tag similar to the following: <iframe sandbox="allow-user-redirect=n" src=...>. Parser 210 can identify the sandbox attribute, which may be set to a redirect limit, as described above. In the example tag above, the "allow-user-redirect" keyword may be used to specify such a redirect limit. This keyword may be set to a value 'n', which may correspond to the value of the redirect limit, which specifies a maximum number of allowed user redirections.

In an embodiment, parser 210 directs rendering engine 230 to create an iframe object to be displayed or rendered within a window of browser 112 on a display of a user device (e.g., user device 110 of FIG. 1, described above). FIG. 3 illustrates an exemplary window 300 of a web browser displaying an iframe 320 within a publisher's web page, according to an embodiment. As shown in FIG. 3, publisher content 312 associated with the publisher's web page may be shown in a content area 310 (e.g., in a frame) separate from iframe 320. Iframe 320 includes third-party content 322. Third-party content 322 may be any type of resource (e.g., a web page) associated with a URL corresponding to a third-party content provider. In an example, the third-party content provider may be an advertiser and third-party content 322 may be an advertisement. As described above, the URL associated with third-party content 322 may be specified in the iframe object, as described above.

Referring back to FIG. 2, parser 210 sends network engine 220 the redirect limit in addition to the URL or source location address of the resource to be displayed within the iframe, according to an embodiment. In an embodiment, network engine 220 uses the redirect limit, as specified in the iframe object (as described above), to restrict the number of user redirections when trying to access the resource over network 170. For example, the redirect limit may be stored by network engine 220 in cache 240. Cache 240 may be any temporary or persistent storage location associated with browser 112. Cache 240 may also be used to store resources associated with a URL.

In an embodiment, network engine 220 generates and stores a user redirect counter, which may be initialized to a value of zero, for example, in order to track the number of user redirects. Network engine 220 may also generate and store a variable or a parameter for the URL associated with the resource to be requested. For example, the requested URL variable may be initially set to the URL in the iframe element, parsed by parser 210, as described above. Network engine 220 can then make a request for the resource to the appropriate third-party server based on the requested URL variable.

For example, network engine 220 may receive a redirection request from the third-party server. In an embodiment, network engine 220 increments the user redirect counter by 1 and sets the requested URL to the new value when such a redirection request is returned from the third-party server. If the value of the user redirect counter exceeds the redirect limit (e.g., as specified by the "allow-user-redirect" keyword, as described above), network engine 220 may ignore the redirect request, thereby stopping additional user redirects in a redirection chain. In an embodiment, network engine 220 may then respond to the redirect request with an error code (e.g., "USER-REDIRECT-COUNT-EXCEEDED.END."). Such an error code may be used to notify the publisher of the web page and/or any third-party that the number of user redirect has been exceeded.

Alternatively, if the value of the user redirect counter is less than the value of the redirect limit, network engine 220 may request the resource from another third-party provider using the new URL, as specified in the redirect request. Network engine 220 can then perform similar operations for tracking user redirects and requested URLs, as described above. When the requested resource associated with an iframe object is received from the third-party, network engine 220 may transmit the resource to rendering engine 230, which can display the resource within the iframe along with other publisher content associated with a web page.

III. Advertiser Example

Figure 4:
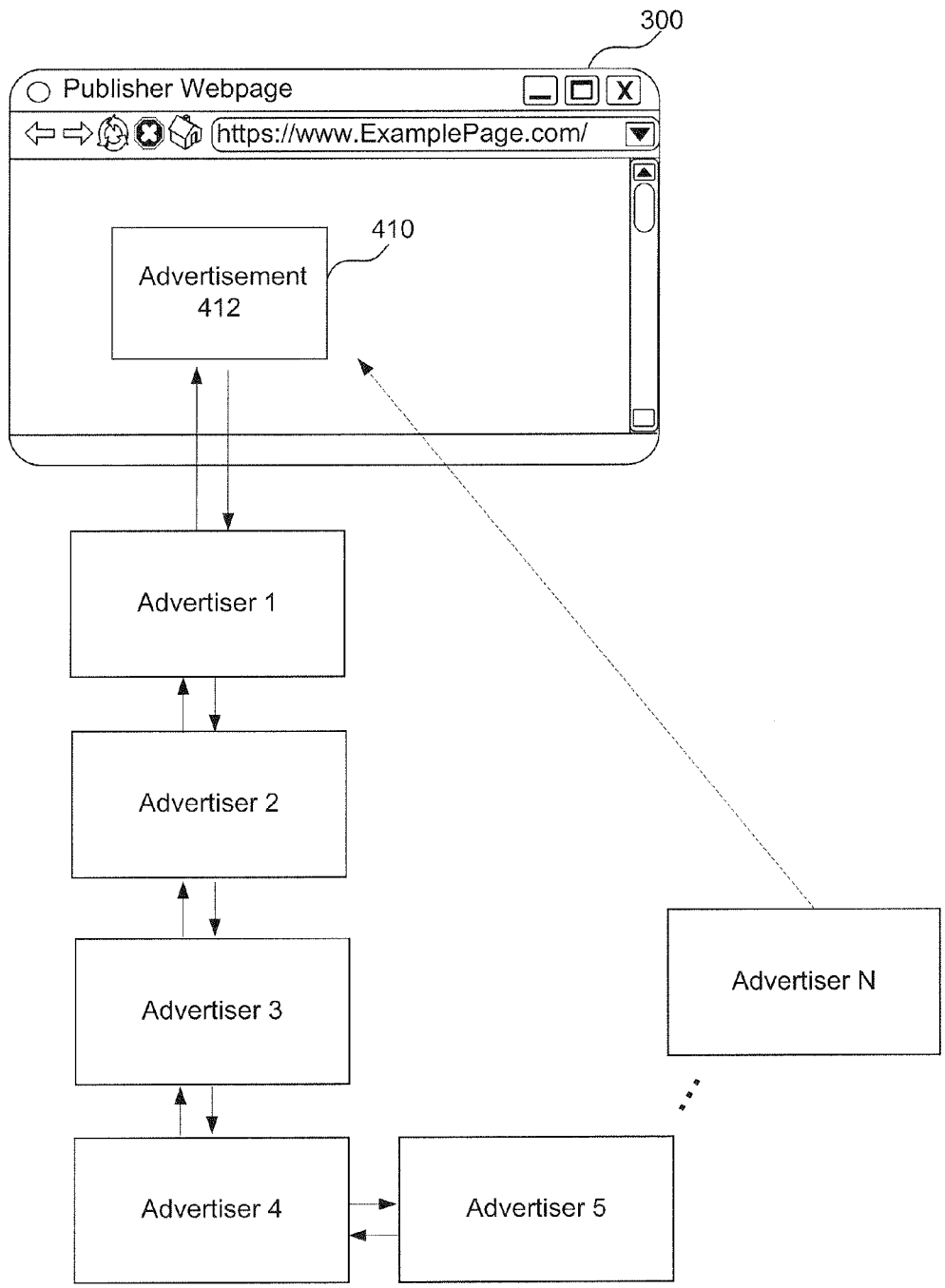
FIG. 4 illustrates an example of a third-party daisy chain of user redirects involving numerous advertisers, according to an embodiment.

FIG. 4 illustrates an example of a chain of user redirects involving numerous advertisers, according to an embodiment. A browser window 400 includes an iframe 410. Iframe 410 displays a resource corresponding to an advertisement 412. In this example, advertiser ad servers are the third-party servers that serve advertisement 412 to the browser to be displayed within iframe 410 in the publisher's web page, as described above. As described above, iframe 410 may include a URL specifying a location of advertisement 412 corresponding to an ad server maintained by an Advertiser 1. Also as described above, the browser may send a request for advertisement 412 to the ad server of Advertiser 1.

However, as shown in FIG. 4, Advertiser 1 may respond to the request with a redirect, instructing the browser to fetch the content from, for example, the ad server of Advertiser 2. The browser would then send a similar request to the ad server of Advertiser 2 as specified in the redirect request from Advertiser 1. Similarly, Advertiser 2 may respond to the browser's second request with another redirect of its own. This type of back and forth flow of requests may continue in a daisy chain fashion of user redirects. For example, the actual advertisement 412 may not be returned to iframe 410 until after an unspecified number of redirects. As discussed previously, a large number of redirects may cause, for example, reduced browser performance while rendering web pages.

Thus, embodiments, as described above, can be used to establish a limit to the number of user redirects in order to restrict the number of links in redirection chain. Such a limit can be used to enforce restrictions on the number of user redirects through a user's web browser. The value of the redirect limit may be controlled by the publisher and/or ad delivery system. For example, the redirect limit may be established based on a system wide policy or per-publisher agreement between the ad delivery systems and the publisher.

IV. Method

Figure 5:
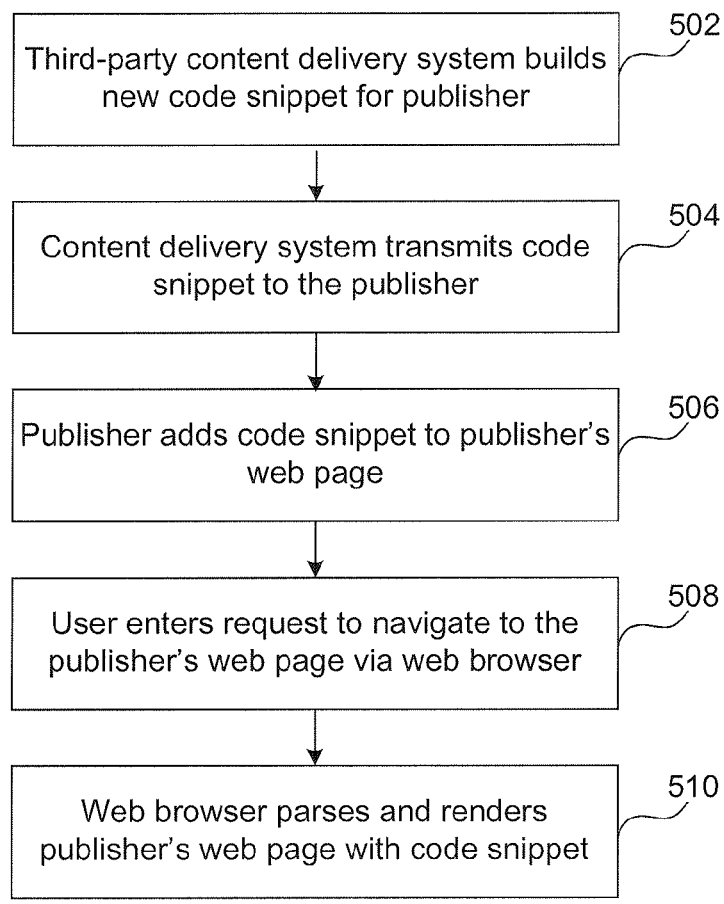
FIG. 5 is a flowchart of an exemplary method for enabling redirect control by a third-party content delivery system, according to an embodiment.

FIG. 5 is a flowchart of an exemplary method 500 for enabling redirect control by a third-party content delivery system, according to an embodiment. For ease of explanation, method 500 will be described with respect to content delivery system 120 of FIG. 1, as described above. However, method 500 is not intended to be limited thereto. Further, the third-party content delivery system may be an advertising delivery system, but method 500 is not intended to be limited thereto.

Method 500 begins in step 502, which includes a generating a new code snippet corresponding to an element of a publisher's web page. For example, the code snippet may be written in HTML and the element may be an HTML iframe element, as described above. The format of the snippet may be similar to the following example: <iframe sandbox="allow-user-redirect=3" src='URL B'></iframe>. "URL B" in this example can represent a URL of a third-party resource that is to be displayed in an iframe within a publisher web page. In an embodiment, the content delivery system uses the code snippet to specify a redirect limit, which restricts the number of redirects that are allowed when a user's browser tries to display a publisher's web page, including the resource associated with the iframe within the publisher web page, as described above. The redirect limit has a value, which may be, for example, a positive integer value corresponding to the maximum number of allowable user redirects.

Method 500 then proceeds to step 504, which includes transmitting the code snippet to the publisher. Steps 502 and 504 may be performed by, for example, content delivery system 120 of FIG. 1, as described above. Once the publisher receives the code snippet from the content delivery system, method 500 proceeds to step 506, in which the publisher adds the code snippet to the publisher's web page. Step 506 may be performed by, for example, publisher server 130 of FIG. 1, as described above.

In step 508, a user initiates a request to navigate to the publisher's web page using a web browser (e.g., by entering a URL associated with the web page in the browser). The user's browser sends a request to retrieve the appropriate web page, which includes the code snippet added by the publisher in step 506. In step 510, the browser parses and renders the web page with the code snippet. For example, the browser may parse the code and identify the redirect limit associated with a sandbox attribute of the iframe to be embedded within the publisher's page. The redirect limit can be used by the browser to control the number of user redirections associated with redirect requests received in response to requests for resources made to third-party content providers, as described above. Portions of step 508 and step 510 may be performed by one or more components of browser 112 (parser 210, network engine 220, and rendering engine 230) of FIG. 2, as described above.

Figure 6A:
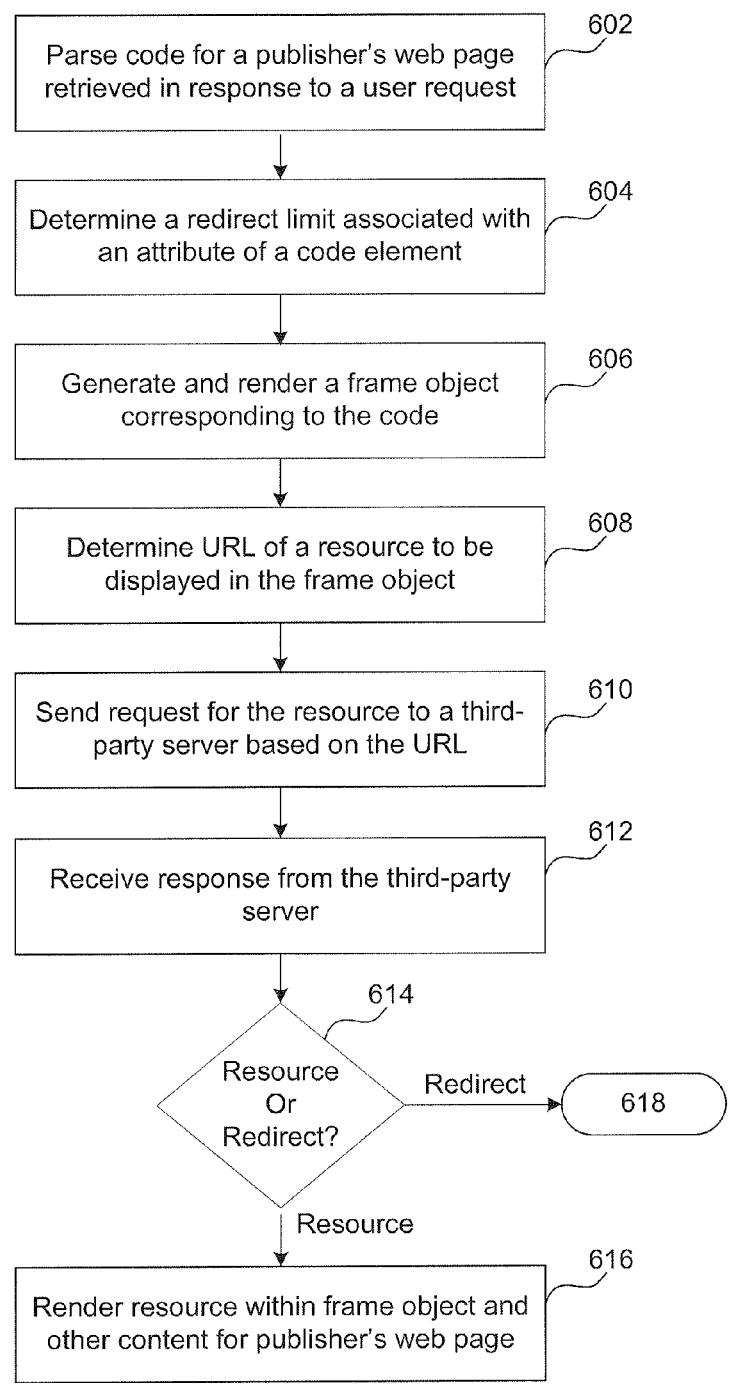
FIGS. 6A and 6B show a flowchart of an exemplary method for limiting user redirects initiated by third-party content providers, according to an embodiment.
Figure 6B:
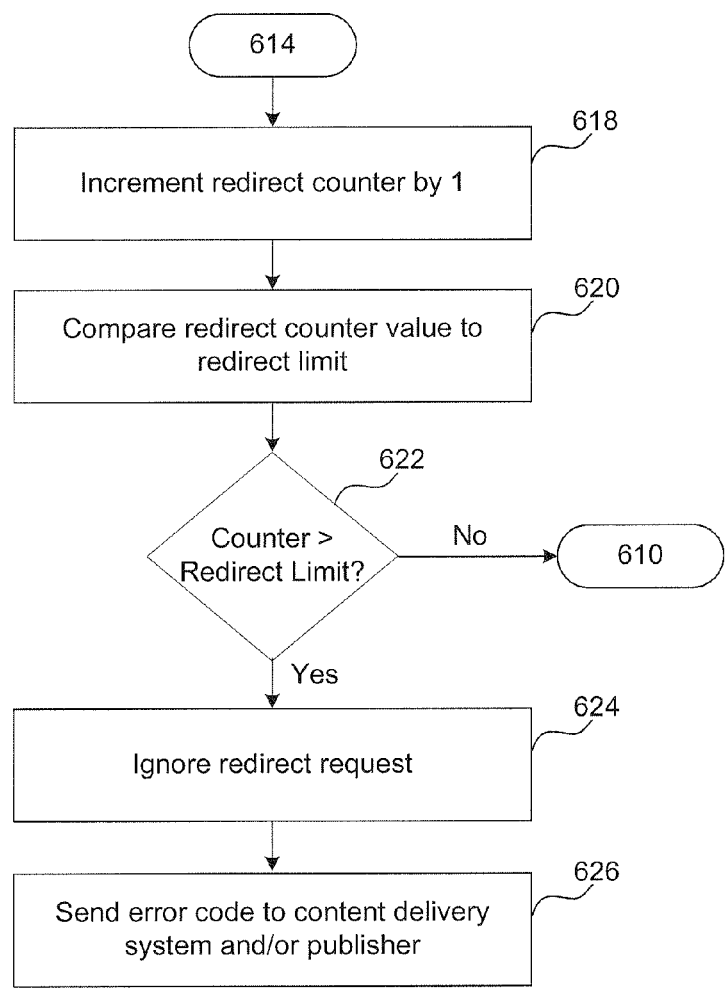

FIGS. 6A and 6B show a flowchart of an exemplary method 600 for limiting user redirects initiated by third-party content providers, according to an embodiment. For ease of explanation, method 600 will be described with respect to system 100 of FIG. 1 and browser 112 of FIG. 2, as described above. However, method 600 is not intended to be limited thereto.

Method 600 begins in step 602, as shown in FIG. 6A. Step 602 includes parsing code for a publisher's web page, which may be retrieved in response to a user request to navigate to the web page. For example, the code may be written in HTML and include a number of HTML elements. Method 600 then proceeds to step 604, which includes determining a redirect limit associated with an attribute of a code element within the publisher's web page. For example, the element may be an iframe element and the attribute may be the sandbox attribute, as described above. The redirect limit may be specified as a keyword associated with the attribute. Further the redirect limit may be set to a value that specifies the maximum number of redirects allowed during the retrieval of a resource to be displayed in the frame object. In step 606, a frame object (e.g., an iframe object) corresponding to the code element is generated and rendered using, for example, a display device coupled to the user's computing device.

Method 600 then proceeds to step 608, in which a URL of a resource to be displayed in the frame object is determined. The URL specifies a location of the resource and may be included in the frame element and/or object. In step 610, a request for the resource is sent to a third-party server based on the URL. As discussed previously, the resource may be an advertisement and the third-party server may be an ad server or ad network. In step 612, a response is received from the third-party server based on the request sent in step 610.

In step 614, it is determined whether the response includes the requested resource or a redirect request, as previously described above. If the response includes the resource, method 600 proceeds to step 616, which includes rendering the resource within the frame object in addition to other content for the publisher's web page. However, if the response includes a redirection request instead, method 600 proceeds to step 618, as shown in FIG. 6B. Step 618 includes incrementing a redirect counter by one, after which method 600 proceeds to step 620, in which the incremented value of the redirect counter is compared to the redirect limit associated with the attribute of the frame element and/or object. In step 622, it is determined whether the redirect counter value is greater than the redirect limit. If the redirect counter value is greater than the redirect limit, method 600 proceeds to step 624, in which the redirect request is ignored. Method 600 may also proceed to step 626, which includes sending an error code to the publisher and/or content delivery system. In addition, the error code may be presented to the user using a display coupled to the user's computing device. The error code notifies the user, publisher, and/or content delivery system that the redirect limit has been exceeded.

Alternatively, if it is determined in step 622 that redirect counter value is less than or equivalent to the redirect limit, method 600 proceeds back to step 610, as shown in FIG. 6A, which includes sending a request for the resource to a third-party server based on a URL. However, the third-party server and URL are different from the previous third-party server and associated URL. In this regard, method 600 iterates through the steps as described above until either the requested resource has been returned by the third-party server (step 616) or the redirect limit has been exceeded (step 624). Thus method 600 may end in either step 616, step 624, or step 626. Although the redirect counter is described in examples as being incremented from zero to a redirect limit, one of skill in the art will recognize that the redirect counter may also be decremented from a redirect limit to zero without departing from the spirit or scope of the present invention.

Benefits associated with methods 500 and 600 include, but are not limited to, lower latency for users, reduced risk of spam, better privacy control by limiting the number of cookies that can get stored on a user's system after each redirect, and better accountability and transparency from third-party content providers.

V Example Computer System

Aspects of the present invention shown in FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

Figure 7:
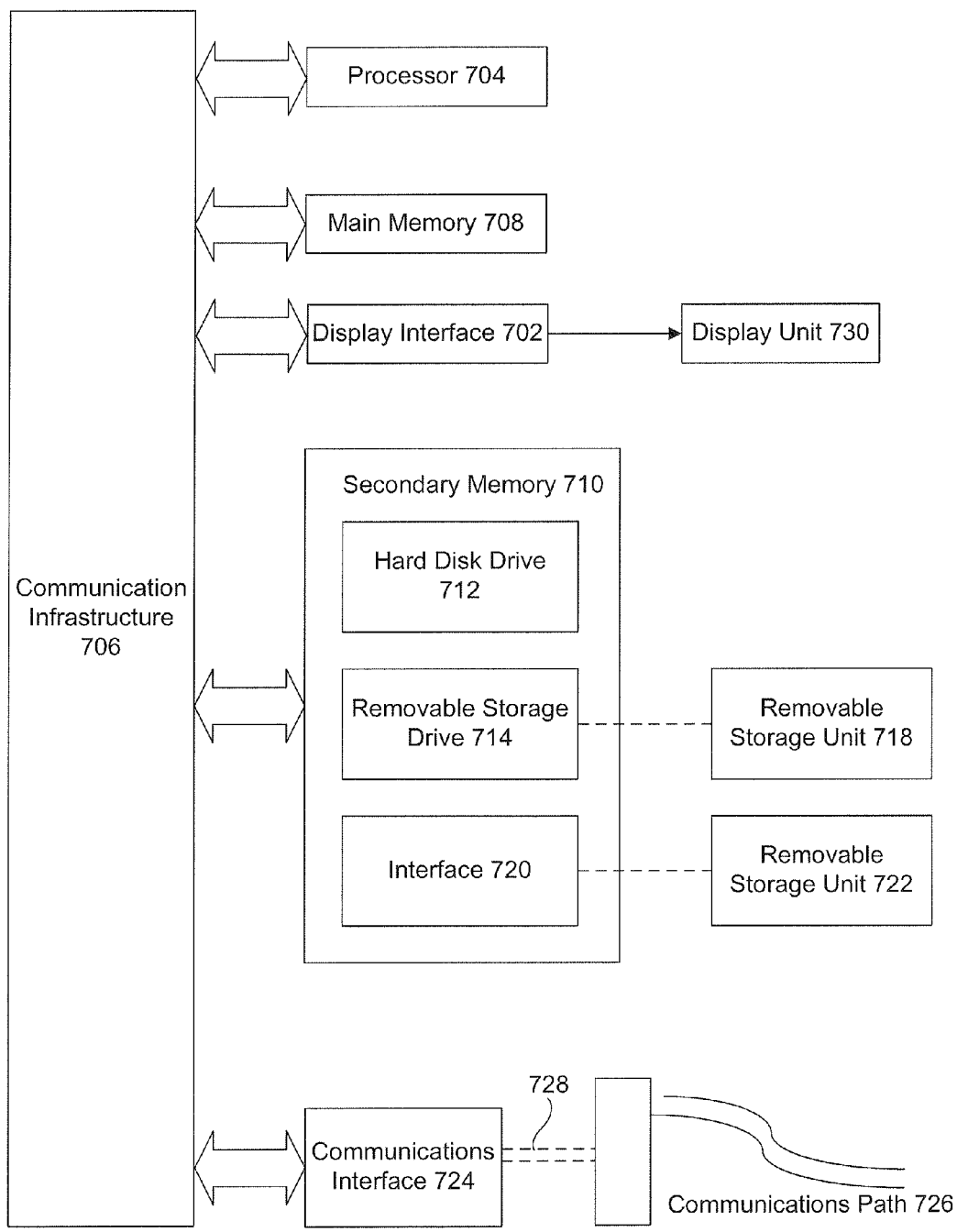
FIG. 7 is a diagram of an example computer system in which embodiments can be implemented.

FIG. 7 illustrates an example computer system 700 in which embodiments of the present invention, or portions thereof, may be implemented as computer-readable code. For example, one or more components of system 100 of FIG. 1 and/or one or more components of browser 112 of FIG. 2, can be implemented in computer system 700 using hardware, software, firmware, tangible computer readable media having instructions stored thereon, or a combination thereof and may be implemented in one or more computer systems or other processing systems. Hardware, software, or any combination of such may embody one or more of the modules and components in FIGS. 1-6.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art, removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement embodiments of the present invention as discussed herein. In particular, the computer programs, when executed, enable processor device 704 to implement the processes of embodiments, such as the stages in the methods illustrated by flowcharts 500 and 600 of FIG. 5 and FIG. 6, respectively, discussed above. Accordingly, such computer programs represent controllers of the computer system 700. Where embodiments are implemented using software, the software may be stored in a computer program product and loaded into computer system 700 using removable storage drive 714, interface 720, and hard disk drive 712, or communications interface 724.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

VI. Conclusion

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for limiting user redirects within a web browser, comprising:
   parsing a frame element in a plurality of elements to identify one or more attributes of the frame element, the plurality of elements encoded in a web page retrieved in response to a user request;
   determining a redirect limit for the frame element from among the one or more identified attributes, wherein the redirect limit specifies a maximum number of user redirects for a third-party resource corresponding to the frame element; and
   responding to a redirect request associated with the third-party resource based on the determined redirect limit, wherein the redirect request is ignored when the redirect limit is exceeded.

2. The method of claim 1, wherein the plurality of elements are Hypertext Markup Language (HTML) elements.

3. The method of claim 2, wherein the frame element is an inline frame element.

4. The method of claim 3, wherein the inline frame element is associated with a third-party content delivery system.

5. The method of claim 4, wherein the responding comprises:
   incrementing a redirect counter value in response to receiving the redirect request;
   comparing the incremented redirect counter value with the determined redirect limit; and ignoring the redirect request when the redirect counter value exceeds the determined redirect limit.

6. The method of claim 5, further comprising:
transmitting an error code to the third-party content delivery system when the redirect counter value exceeds the determined redirect limit.

7. The method of claim 6, wherein the third-party content delivery system is an advertising delivery system and the third-party resource is an advertisement.

8. The method of claim 6, wherein the inline frame element of the web page is encoded using an HTML tag having an attribute that specifies the redirect limit.

9. The method of claim 8, wherein the HTML tag is a sandbox tag.

10. A system for limiting user redirects in a web browser, comprising:
one or more processors;
a parser, implemented on the one or more processors, to parse a frame element in a plurality of elements to identify one or more attributes of the frame element, the plurality of elements encoded in a web page retrieved in response to a user request, and to determine a redirect limit for the frame element from among the one or more identified attributes, wherein the redirect limit specifies a maximum number of user redirects for a third-party resource corresponding to the frame element; and
a network engine, implemented on the one or more processors, to respond to a redirect request associated with the third-party resource based on the redirect limit, wherein the redirect request is ignored when the redirect limit is exceeded.

11. The system of claim 10, wherein the plurality of elements are Hypertext Markup Language (HTML) elements.

12. The system of claim 11, wherein the frame element is an inline frame element.

13. The system of claim 12, wherein the inline frame element is associated with a third-party content delivery system.

14. The system of claim 13, further comprising:
a rendering engine, implemented on the one or more processors, to render the inline frame element with the third-party resource within the web page using a display device, wherein the third-party resource is provided by the third-party content delivery system.

15. The system of claim 13, wherein the network engine is configured to:
increment a redirect counter value in response to receiving the redirect request;
compare the incremented redirect counter value with the determined redirect limit; and
ignore the redirect request when the redirect counter value exceeds the determined redirect limit.

16. The system of claim 15, wherein the network engine is further configured to transmit an error code to the third-party content delivery system when the redirect counter value exceeds the determined redirect limit.

17. The system of claim 13, wherein the third-party content delivery system is an advertising delivery system and the third-party resource is an advertisement.

18. The system of claim 13, wherein the inline frame element of the web page is encoded using an HTML tag having an attribute that specifies the redirect limit.

19. The system of claim 18, wherein the HTML tag is a sandbox tag.

20. The system of claim 10, wherein the parser and the network engine are implemented as components of the web browser.

* * * * *